United States Patent [19]

McCullough

[11] Patent Number: 5,176,575
[45] Date of Patent: Jan. 5, 1993

[54] FLEXIBLE COUPLING COMPRISING MODULAR COMPONENTS

[75] Inventor: Edward W. McCullough, Warren, Pa.

[73] Assignee: Rexnord Corporation, Milwaukee, Wis.

[21] Appl. No.: 443,796

[22] Filed: Nov. 24, 1989

Related U.S. Application Data

[63] Continuation of Ser. No. 298,824, Jan. 18, 1989, abandoned, which is a continuation of Ser. No. 144,660, Jan. 12, 1988, abandoned, which is a continuation of Ser. No. 862,336, May 12, 1986, abandoned.

[51] Int. Cl.⁵ ............................................. F16D 3/79
[52] U.S. Cl. ................................... 464/099; 464/147
[58] Field of Search ............... 403/3, 4, 335, 336, 403/337; 464/92, 93, 94, 95, 96, 98, 99, 106, 137, 147, 160, 185

[56] References Cited

U.S. PATENT DOCUMENTS

| | | | |
|---|---|---|---|
| 1,402,688 | 1/1922 | Travis | 464/93 X |
| 2,182,711 | 12/1939 | Thomas | 464/99 |
| 2,745,267 | 5/1956 | Hagenlocher | 464/99 X |
| 3,003,340 | 10/1961 | Miller | 464/160 |
| 3,229,480 | 1/1966 | Seigel et al. | 464/93 X |
| 3,266,270 | 6/1966 | Yutkowitz | 464/99 |
| 3,935,716 | 2/1976 | Symann | 464/94 |

FOREIGN PATENT DOCUMENTS

| | | | |
|---|---|---|---|
| 460222 | 10/1949 | Canada | 464/99 |
| 2200050 | 7/1973 | Fed. Rep. of Germany | 464/98 |
| 134630 | 10/1981 | Japan | 464/160 |
| 669098 | 7/1979 | U.S.S.R. | 403/4 |

Primary Examiner—Daniel P. Stodola
Assistant Examiner—William G. Battista, Jr.
Attorney, Agent, or Firm—Michael, Best & Friedrich

[57] ABSTRACT

A coupling for connecting a rotary power source to a driven device and accommodating misalignment between the source and device. The coupling has at least two identical modular center members having a plurality of alternative circumferential positions relative to each other and which also may be positioned with either axial end toward each other. The coupling includes hub members which may also be identical to the center members.

8 Claims, 3 Drawing Sheets

FLEXIBLE COUPLING COMPRISING MODULAR COMPONENTS

This is a continuation of U.S. patent application Ser. No. 298,824, filed Jan. 18, 1989, now abandoned, which is a continuation of U.S. patent application Ser. No. 144,660, filed on Jan. 12, 1988, now abandoned, which is a continuation of U.S. patent application Ser. No. 862,336, filed on May 12, 1986, now abandoned.

FIELD OF THE INVENTION

This invention relates to a coupling for transmitting rotary power from a rotary power source to a device driven by the power source and which compensates for misalignment between the power source and the driven device. In particular, this invention relates to a flexible transmission coupling comprising modular components.

BACKGROUND OF THE INVENTION

Flexible torque transmission couplings are old and well-known devices for transmitting rotary power under conditions in which misalignment exists between the rotating power source and the device receiving the rotating power. Flexible couplings employing one or more flex elements consisting of a plurality of flexible laminations or layers and other components connected together are widely used. An example of such a flexible coupling comprising a number of flex elements and connecting members to provide an overall coupling structure is disclosed in U.S. Pat. No. 2,745,267, issued May 15, 1956. Such flexible couplings typified by the coupling of the '267 patent include a pair of flange hub members mounted on opposing shafts of the rotary source and driven devices, a pair of spool-type center members, and a flexible element mounted between facing center members and hubs. Generally, the reason for having two center members is to enable removal of center member and flex element components without moving connected equipment where one hub on the connected equipment is of an inverted design, that is, the hub portion is on the center member side of the flange. Similarly, three center members may be used where both hubs are inverted.

A significant drawback of presently known flexible couplings is their significant cost.

Since each flexible coupling is made of several different specially designed parts, the cost of manufacturing the coupling is relatively substantial. Moreover, because of the variety of parts required, both the distributors and users of the couplings must maintain a substantial inventory for replacement and repair purposes. Further, manufacturing of the couplings is expensive because of the machining work required to make them.

SUMMARY OF THE INVENTION

It is a general object of this invention to provide a low cost flexible coupling utilizing a plurality of identical modules which may be easily and economically fabricated. It is also an object of this invention to provide such modules as center members in a flexible coupling which have alternative circumferential positions relative to each other. It is another object of this invention to utilize such modules in a flexible coupling as hub members of the coupling. It is another object of this invention to utilize such modules in a flexible coupling in which the modules are positioned between adjacent modules to function as spacing means.

The invention is carried out by providing a flexible coupling having two spaced apart hub means positioned on a common axis, one of the hub means being mounted on a rotary power source and the other hub means being mounted on a device driven by the rotary power source. A pair of modules comprising identical center means are positioned between the hubs and flexible disc members are positioned between each hub and one of the center means. Each center means and the adjacent hub are connected at spaced apart locations to the flexible disc member between them. The pair of center means have a first position at which they may be fixed and in which the bosses on the pair of center means are aligned in an axial direction and a second alternative position in which the pair of center means may be fixed in which their bosses are out of alignment in an axial direction. The hubs, flexible disc members and center means function to transmit rotary driving force from the power source to the driven device.

Each one of the hub means may also comprise a modular component and be identical to each one of the modular component center means. In such case, each hub means has a boss extending toward the other hub means and toward a center means and the flexible disc member connected to an adjacent center means is also connected to the boss of the hub means.

An additional modular center means identical to each one of the pair of center means may be used for spacing purposes if so desired between the pair of center means.

The center means may contain slot-shaped openings through which fastening means extend and which permit the hub means at one end of the coupling to be positioned relative to the hub means at the other end of the coupling at infinitely variable circumferential positions about their common axis. It is additionally possible to increase the total amount of circumferential adjustability through the addition of an identical slotted center member, which will also increase the axial spacing of the coupling.

The modular components may be made of a compressed powdered metal or structural plastic material to facilitate their fabrication. In such case, each of their bosses preferably has a length in the circumferential direction of the modular component or in the direction of the driving force applied to the modular component that is greater than the radial thickness of the boss and is determined by the tensile strength of the material and the amount of driving force applied to the boss.

BRIEF DESCRIPTION OF THE DRAWINGS

Further objects and advantages of the invention will appear when taken in conjunction with the accompanying drawings in which.

DETAILED DESCRIPTION OF THE INVENTION

Figure 1:
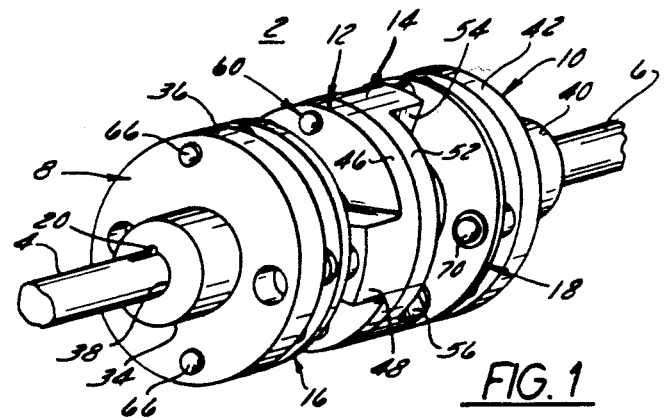
FIG. 1 is a perspective view of a flexible coupling according to the invention, connecting shafts of a rotary drive source and a device driven with rotary power from the drive source.

Referring generally to FIGS. 1-4, a flexible coupling 2 according to the invention is illustrated connecting the shaft 4 of a rotary power source (not shown) to the shaft 6 of a device (not shown) driven by the rotary power source. The shafts 4 and 6 have an aligned position along a common axis. However, since it is not generally possible to place the shafts in perfect axial alignment with each other, it is the function of the flexible coupling 2 to accommodate such misalignment while transferring rotary power from one shaft to the other. The flexible coupling 2 includes hub means 8 mounted on the shaft 4, hub means 10 mounted on the shaft 6, a pair of modular component center members 12 and 14, and flexible disc members 16 and 18.

Figure 2:
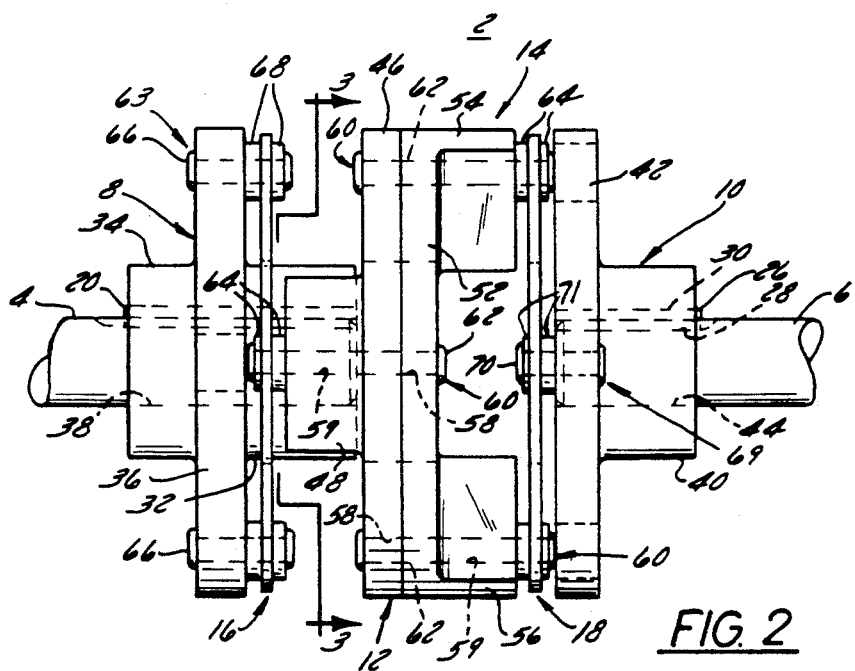
FIG. 2 is a side elevation view of an embodiment of the flexible coupling.
Figure 3:
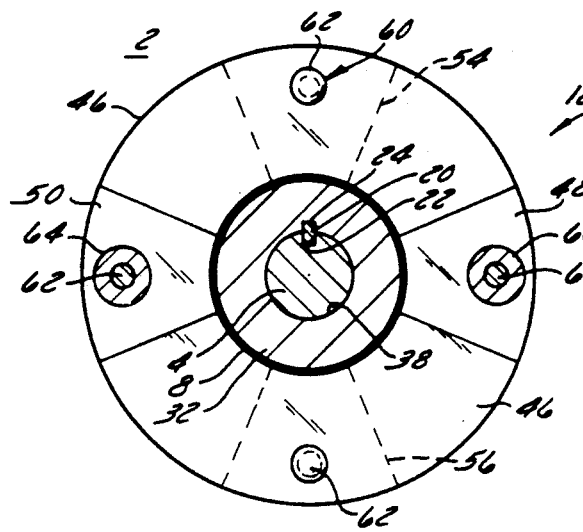
FIG. 3 is a cross-sectional view taken along lines 3—3 of FIG. 2.

As shown in FIG. 3, the hub means 8 is affixed to the shaft 4 by means of a key 20 seated in a keyway 22 in the shaft 4 and in a keyway 24 in the hub means 8. Similarly, with reference to FIG. 2, the hub means 10 is affixed to the shaft 6 by means of a key 26 seated in a keyway 28 in the shaft 6 and in a keyway 30 in the hub means 10. The hub means 8 includes an inner sleeve member 32, an outer sleeve member 34 and a flange 36 extending from the two sleeve members. The shaft 4 extends into an opening 38 in the sleeve members 32 and 34. The hub means 10 has an outer sleeve member 40 and a flange 42 extending radially outward from the sleeve member 40. The shaft 6 extends into an opening 44 in the sleeve member 40. The center member 12 has a base portion 46 and bosses 48 and 50 projecting from the base portion 46 in an axial direction toward the hub means 8. The center member 14 has a base portion 52 and bosses 54 and 56 extending in an axial direction away from the center means 12 and in an axial direction toward the hub means 10. The base portions 46 and 52 of the two center means are positioned against each other although, if adjustment in spacing is needed, shimming material may be positioned between the two base portions so that they will be adjacent to each other but not in contact.

A fastening means 60 holds the two center means 12 and 14 together and comprises a plurality of rods 62 each of which extend through an opening 58 in a base portion of one of the center means, an opening 59 in a boss of the other center means, and the flexible disc member between the boss and the hub means toward which the boss extends. A pair of washers 64 are positioned on each of the rods 62 between the boss and the flexible disc member and on the end of the rod to space the flexible disc member from the boss and to assist in holding it on the rod. The rods 62 have riveted ends to retain the center members and flexible members on the rods. The flexible disc member 16 is also fastened to the hub means 8 by fastening means 63 including riveted rods 66 extending through the flange 36 of the hub means 8 and the flexible disc member 16 at positions spaced from the fastening locations of the flexible disc member 16 to the bosses 48 and 50 of center member 12. Washers 68 are positioned between the flange 36 of hub means 8 and flexible member 16 and on the ends of the rods 66 to assist in retaining and positioning the flexible member 16 on the hub means 8. The flexible member 18 is fastened to hub means 10 by fastening means 69 including riveted rods 70 extending through the flange 42 of hub means 10 and the flexible member 18 at locations on the flexible member 18 spaced apart from the fastening connections of the flexible member 18 to the bosses 54 and 56 of center member 14. Washers 71 are positioned on each of the rods 70 between the flange 42 and the flexible member 18 and on the end of each rivet rod 70 to assist in retaining and positioning the flexible member 18 on the rods.

Figure 4:
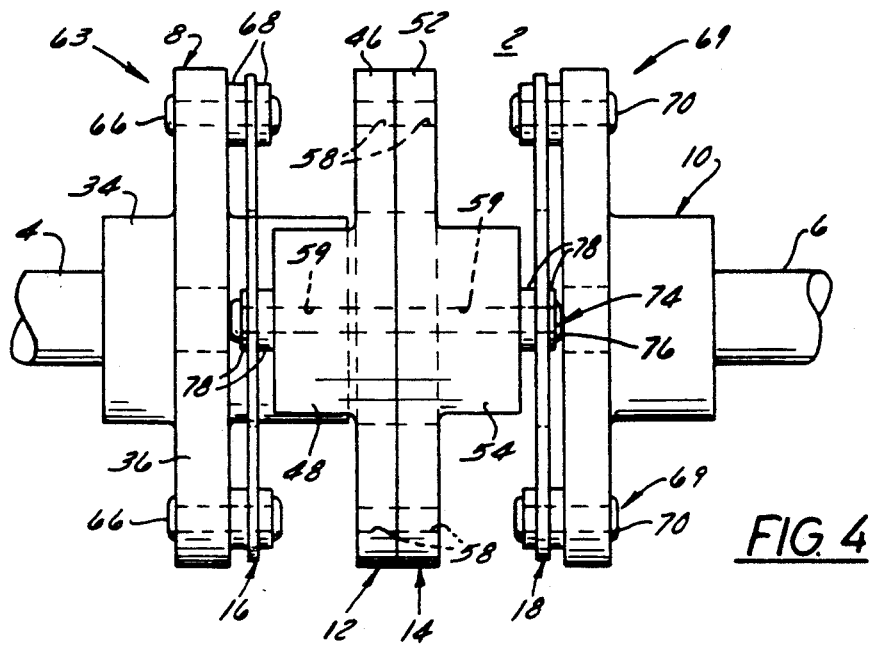
FIG. 4 is a side elevation view of the embodiment of the flexible coupling illustrated in FIG. 2, but with the bosses of the center members in an alternative aligned position.

In FIGS. 1-3, the pair of center means 12 and 14 are illustrated in a first position with their bosses out of alignment and the bosses 48 and 50 centered on a first radial plane and the bosses 54 and 56 centered on a second radial plane transverse to the first radial plane. This position of the two center means provides the maximum torque and speed capacity of the flexible coupling 2 because it results in the minimum overhung length of the fastening rods 62. With respect to FIG. 4, the flexible coupling 2 is shown with the pair of center means 12 and 14 in a second alternative position in which their bosses are centered on the same radial plane, that is, aligned in an axial direction. In this position of the pair of center means, fastening means 74 comprising washers 78 and rivet rods 76, which are longer than rivet rods 62 shown in FIG. 2, is utilized for fastening the bosses of the two center means and both the flexible disc member 16 and 18 together. The alternative position of the center means 12 and 14 shown in FIG. 4 is possible due to their modularity, that is, the identical shape and construction of the two center means. For example, the openings 58 in the base portions of each center means have the same radial location and angular spacing from associated bosses which permits the alternative position of the pair of center means with the bosses out of alignment as illustrated in FIG. 2. Similarly, the projecting bosses in both center means have the same angular and radial location and the openings through the bosses on both center means are at the same position on the boss so that these openings will be aligned to permit the passing therethrough of a fastening rod when the bosses of the two center means are axially aligned, as shown in FIG. 4. The benefit of the position of the flexible coupling 2 as shown in FIG. 4 is that the coupling costs less because fewer fasteners are used and also a smaller number of fasteners can be maintained in an inventory by the user of the coupling.

Figure 5:
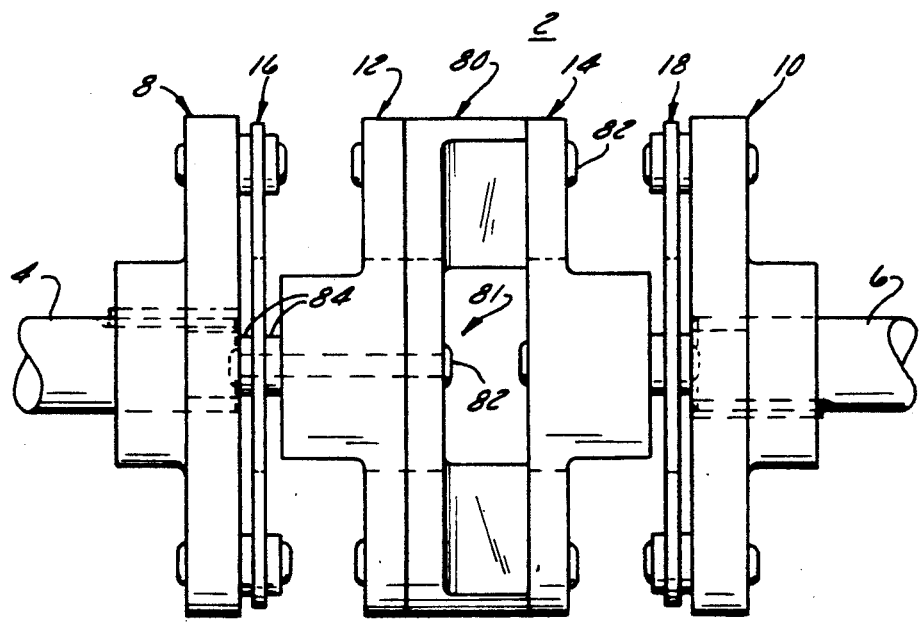
FIG. 5 is a side elevation view of another embodiment of the flexible coupling.

With reference to FIG. 5, another embodiment of the invention is shown in which an additional center means 80 is positioned between the center means 12 and 14. The additional center means 80 thus acts as a spacer in the flexible coupling 2 to provide overall center member length adjustment. In effect, the center means 12, 14 and 80 are "stacked" in an axial direction to provide the needed axial length of the coupling means for a particular application. A further additional center means may also be stacked in the combination for spacing purposes and, if fine adjustment of spacing is required, shim material can be combined with the stacked plurality of center means to meet the spacing requirement. The ability to use modular center members for length adjustment reduces the inventory the distributor and user must carry and thereby the cost of the coupling to the user. In addition, presently used center members are often specially machined to custom length, which takes a considerable amount of time, and the time saved in procuring the modular center member components of the invention is of considerable importance in some critical applications. The fastening means 81 for the plurality of center means illustrated in FIG. 5 comprises rods 82 having sufficient length to pass through the stacked plurality of center means and washers 84 positioned on the ends of the riveted rods to assist in retaining the plurality of center means on the rods.

Figure 6:
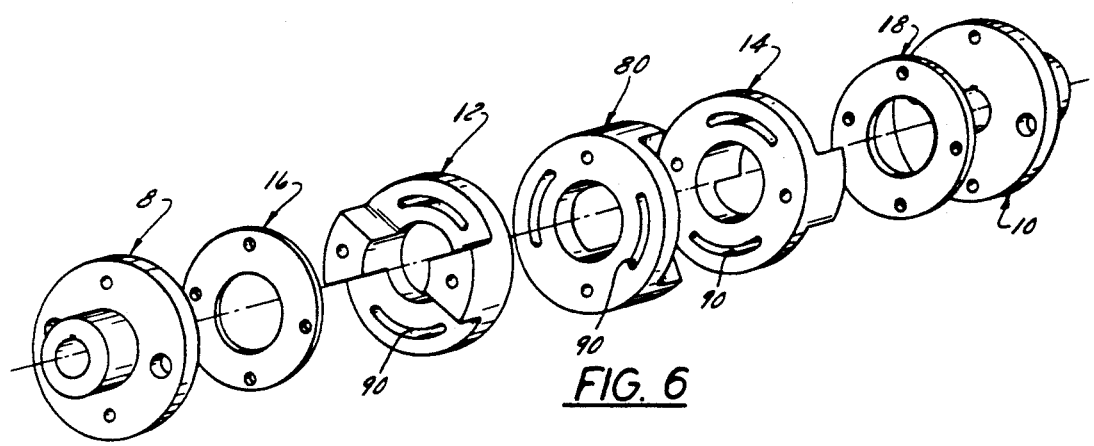
FIG. 6 is an exploded perspective view of three adjacent modular components of the embodiment of the invention.

In FIG. 6 there is illustrated an embodiment of the invention in which the base portions of each of the center means included in the flexible coupling 2 have slots 90 extending therethrough. The slots permit infinitely variable positioning or adjustment of each center means relative to the other center means within the limitations of the slot length, e.g., as a method of easily providing circumferential positioning of the hubs at each end of the coupling which may not be obtainable simply by selecting one of the alternative positions of the center member as discussed with respect to FIGS. 1-4. Note also that where three slotted center means are "stacked," as shown in FIG. 6, twice the circumferential adjustability can be provided compared to a design comprising only two center means.

Figure 7:
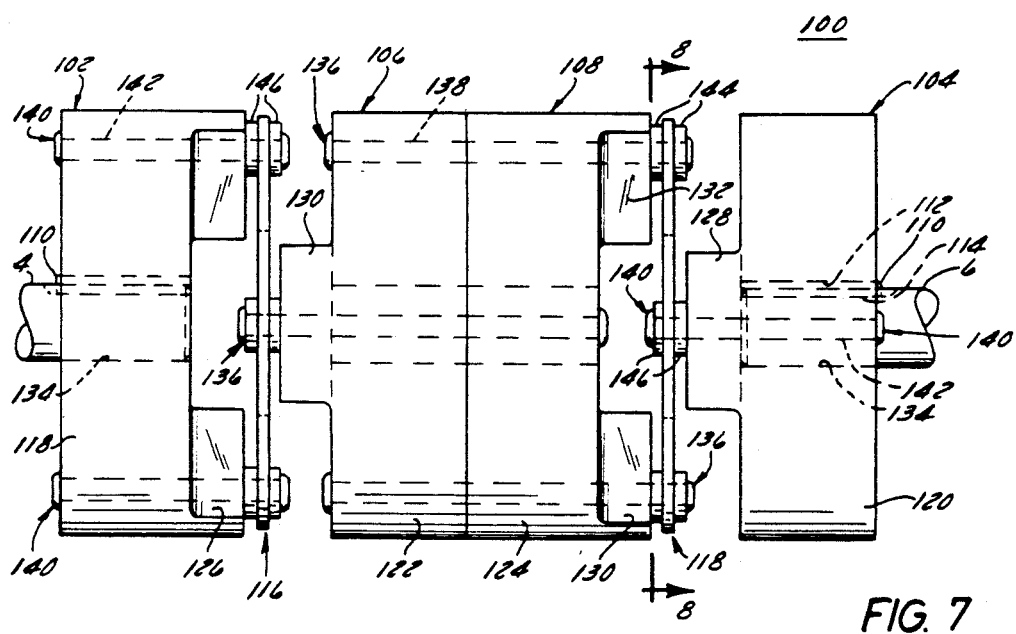
FIG. 7 is a side elevation view of another embodiment of the invention.
Figure 8:
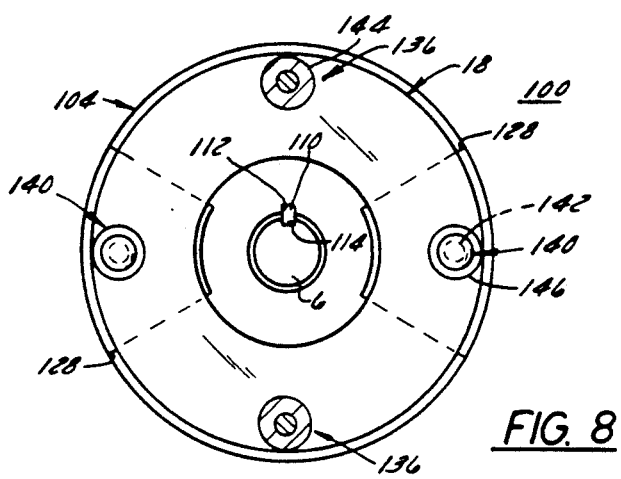
FIG. 8 is a cross-sectional view taken along lines 8—8 of FIG. 7.

In FIGS. 7 and 8, an embodiment of the invention is shown in which the hub means comprise modular components which are also identical in structure to the center means. The flexible coupling 100 includes modular hub means 102 and 104, modular center means 106 and 108, and flexible disc members 16 and 18, all positioned in generally axial alignment along the axis of the rotary power source shaft 4 and the driven device shaft 6. The hub means 102, 104 and center members 106, 108, respectively, have base portions 118, 120, and 122 and 124 and axially extending boss portions 126, 128, and 130, 132. The base portions 118, 120 of the hub means 102, 104 have an internal diameter 134 and an axial dimension which permits the bases to engage the shafts 4 and 6 and thereby support the hub means 102 and 104 on the shafts. The hub means are held in place on shafts 4 and 6 by identical keys 110 in keyways 112 of the hub means 102, 104 and keyways 114 of shafts 4, 6. The fastening means 136 utilized for fastening the center members 106 and 108 together and connecting the center members to the flexible disc elements 16 and 18 includes washers 144 and rivet rods 138 which are similar to but longer than the fastening means 60 illustrated in FIG. 2. The fastening means 140 fastens each of the hub means to the adjacent flexible disc member 16 or 18 by means of rivet rods 142, which are somewhat shorter than rods 138, and washers 146. The embodiment illustrated in FIGS. 7 and 8 takes maximum advantage of the modular component benefit of the invention by utilizing identical components for both the hub members and center members. The center member slots illustrated in FIG. 6 and the stacked additional center member illustrated in FIG. 5 may also be used in combination with the flexible coupling 100 of FIGS. 7 and 8 to obtain the additional benefits of these embodiments.

The flexible coupling as disclosed herein may be made from several different types of materials using appropriate fabrication methods. These include conventional machining of steel, pressure forming of powdered metal, steel stamping, and injection molding of plastic. Pressure forming of powdered metal is a preferred process and method because it can be quickly and easily carried out. Also, the simplicity of the modular component structure of the center members and hub means lends itself well to the powdered metal process. However, substantial rotating force is applied to the bosses of the center members which therefore must have sufficient tensile strength to withstand such driving force. Consequently, the length of the boss in the direction of the driving force, typically in a circumferential or angular direction about the axis of the shafts of the power source and driven device, must be sufficient to withstand the driving force. Because powdered metal may not have the tensile strength of some other types of steel, the angular length of the bosses must be relatively greater than if the center members were of machined steel. Typically, this length will be significantly greater than the thickness of the bosses in their radial direction extending from the axes of the center members.

It will be understood that the foregoing description of the present invention is for purposes of illustration only and that the invention is susceptible to a number of modifications or changes, none of which entail any departure from the spirit and scope of the present invention as defined in the hereto appended claims. For example, the fastening means have been described herein as comprising rods having riveted ends for retaining the bosses and flexible disc members together. However, the rods may have threaded ends carrying nuts for fastening the bosses and flexible members together. Further, the center means have been described herein as comprising two bosses per center means. However, three or more bosses may be used.

What is claimed is:

1. A flexible coupling connected between a rotary power source and a rotatable driven device along an axis between said power source and said driven device for accommodating misalignment between the power source and the driven device, the flexible coupling comprising:

an input hub mounted on and connected to rotate with the power source and an output hum mounted on sand connected to rotate with said driven device;

first and second identical center connectors connected together and positioned between said input and output hubs, each of said center connectors having a base and at least two circumferentially spaced-apart bosses integral with said base and projecting away from the other connector toward one of said hubs, a hole in each boss and at least two circumferentially spaced apart holes in each connector base;

a first fastening member extending through a hole in a boss of one of the connectors and extending through one of the holes in the other connector and connecting said connectors, a second fastening member extending through a hole in a boss of the other of the connectors and extending through one of the holes in the one connector and connecting the connectors;

a first flexible disc connected to said input hub and connected to said one of the connectors by said first fastening member extending through a hole in a boss of the one of the connectors and said one hole in the other connector; and a second flexible disc connected to said output hub and connected to said other of said connectors by said second fastening member extending through a hole in a boss of the other of the connectors and said one hole in the one connector;

whereby rotary driving force provided by the rotary power source is transmitted through said input hub, through said flexible discs and connectors, and through said output hub to said driven device.

2. A flexible coupling as set forth in claim 1 wherein the holes in each connector base comprise arcuate slots through the base, the arcuate slots in said base of one connector being axially aligned with respective holes in bosses of the other connector when said first and second connectors are connected together and said fastening members extending through said aligned slots and said holes in said bosses.

3. A flexible coupling, connected to a rotary power source and a device driven by the power source along an axis between the power source and driven device, for accommodating misalignment between the power source and the driven device, the flexible coupling comprising:
identical input and output hubs respectively mounted on and connected to the power source and the driven device, each hum comprising an annular base and at least two spaced-apart bosses extending from said base toward the other hub;
first and second connectors positioned between the two hubs for transmitting rotary force from one hub to the other, each connector being identical to the other and to each of the hubs, said first connector having its two spaced-apart bosses extending from its base toward the input hub and the second connector having its two spaced-apart bosses extending from its base toward the output hub; and
fastening means connecting said first and second connectors, and
a first flexible disc connected to the bosses of the first connector and also to the bosses of said input hub at a location spaced from the connection with the bosses of said first connector, and a second flexible disc connected to the bosses of the second connector and also to the bosses of said output hub at a location spaced from the connection with the bosses of the second connector whereby rotary driving force is transmitted through the hubs, the flexible disc and the connectors.

4. The flexible coupling as set forth in claim 3 wherein: each boss of each connector has an opening therethrough, each base portion of each connector having an arcuate slot-shaped opening therethrough, and said first and second connectors being positioned relative to each other such that the opening through each boss of each connector is selectively aligned with an opening in the other connector; and wherein said fastening means connecting said first and second connectors includes rods connecting said first and second connectors together, each rod passing through the opening in each boss of said connector and through an adjacent flexible disc and through an opening in the other connector.

5. The flexible coupling as set forth in claim 3 and wherein the fastening means includes a first rod member extending through the first and second connectors and extending through the first flexible disc to fasten the pair of connectors and the first flexible disc together.

6. The flexible coupling in accord with claim 3, wherein:
each hub and connector comprises an annular base with each integral projecting boss extending outwardly along a segment of said annular base, the outer circumferential length of each said boss being greater than the radial thickness of said boss.

7. The flexible coupling as set forth in claim 3 and further including: at least two slots through the base portion of each said connector, each slot in the base portion of a connector being axially aligned with an opening in a boss of the other connector, said fastening means including a member extending through each aligned slot and opening, each of the connectors being rotationally movable relative to an adjacent connected connector in the direction of the slot lengths such that the connectors and thus the hubs at each end of the coupling are rotationally adjustable in said direction.

8. A flexible coupling, connected to a rotary power source and a device driven by the power source along an axis between the power source and the driven device, for accommodating misalignment between the power source and the driven device, the flexible coupling comprising:
input and output hubs respectively mounted on and connected to the power source and the driven device, each hub comprising an annular base and at least two spaced-apart bosses extending from said base toward the other hub;
first and second connectors positioned between the two hubs for transmitting rotary force from one hub to the other, each connector including an annular base and at least two spaced-apart bosses extending from said base, the two spaced-apart bosses of the first connector extending from the base of the first connector toward the input hub and the two spaced-apart bosses of the second connector extending from the base of the second connector toward the output hub;
fastening means connecting said first and second connector;
a first flexible disc connected to the bosses of the first connector and also connected to the bosses of said input hub at locations spaced from the connection with the bosses of said first connector, and a second flexible disc connected to the bosses of the second connector and also connected to the bosses of said output hub at a location spaced from the connections with the bosses of the second connector whereby rotary driving force is transmitted through the hubs, the flexible disc and the connectors,
the fastening means including a fastening member extending through the first and second connectors and extending through one of the first flexible disc and the second flexible disc to fasten the first and second connectors and said one of the first flexible disc and the second flexible disc together.

* * * * *